_United States Patent_ [19]

Muck et al.

[11] 3,993,618

[45] Nov. 23, 1976

[54] COATINGS FOR FIBROUS SHEET MATERIAL OF POLYURETHANE AND OIL-LIKE HYDROCARBON POLYMER

[75] Inventors: Eduard Muck, Otrok ovice, Czechoslovakia; Jaroslav Strachota, deceased, late of Veselinad Moravou, Czechoslovakia, by Vera Strachotova, legal representative; Petr Hlozek, Veseli nad Moravou; Josef Horak, Gottwaldov, both of Czechoslovakia

[73] Assignee: Statni vyzkumny ustav kozedelny, Gottwaldov, Czechoslovakia

[22] Filed: Jan. 30, 1974

[21] Appl. No.: 438,009

Related U.S. Application Data

[63] Continuation of Ser. No. 177,500, Sept. 7, 1971, abandoned.

[52] U.S. Cl. .................. 260/33.6 UB; 260/2.5 AL; 260/29.2 TN; 260/29.6 NR; 260/32.6 NR; 260/859 R; 428/423
[51] Int. Cl.$^2$............................................ C08K 5/01
[58] Field of Search ............... 260/29.6 NR, 29.6 R, 260/29.2, 2.5 N, 33.6 UB, 859

[56] References Cited
UNITED STATES PATENTS
3,310,604   3/1967   Steingiser et al. ................. 260/859

_Primary Examiner_—Harld D. Anderson

[57] ABSTRACT

This invention relates to a coating composition which is a mixture of an elastomeric material and a homopolymeric material alone or in admixture with a copolymeric material, the coating having good microporous properties and agreeable "hand" and pliability.

21 Claims, No Drawings

COATINGS FOR FIBROUS SHEET MATERIAL OF POLYURETHANE AND OIL-LIKE HYDROCARBON POLYMER

This application is a continuation in part of our co-pending application, Ser. No. 177,500, filed on Sept. 7, 1971 now abandoned.

This invention relates to coating compositions. More particularly, it relates to coating compositions which form films on substrates and in which the film coating or coating layer exhibits good microporosity as well as an agreeable "hand" and an improved pliability. Still more particularly, the invention relates to mixtures of elastomeric materials and a homopolymeric material which additionally may contain a copolymeric material therein and which are suitable for coating flexible sheet materials on substrates of fibrous character. The copolymeric material is formed from lower olefinic monomers, i.e., those containing about 2 to about 4 carbon atoms in their chain and substituted olefinic monomers wherein the substituent groups are higher linear or branched chain alkyl groups, i.e., those containing about 4 to about 20 carbon atoms in their chain or a cyclic molecule having the ability to combine with an alkyl radical and the homopolymers formed from lower olefin monomers containing about 2 to about 4 carbon atoms in their chain.

Flexible sheet materials for use in the present invention include conventional woven, non-woven or knitted mats, sheets or films of natural vegetable or animal fibers or synthetic fibers including various mixtures thereof, all of which are known in the art.

Various coating compositions and processes for their manufacture are known for use in the preparation of layers on flexible sheet materials, as for instance from polyurethane elastomers, dissolved in suitable organic solvents. The polyurethane may be used alone or it may contain various fillers, such as, for example, polyvinyl chloride, dyestuffs, leather powder, polypropylene or polyisobutylene oil. The invention therefore generally relates to a fibrous mat sheet or film coated with the elastomeric material. After the organic solvent is washed from the material, a coating layer is formed possessing good microporous structure so that the final product is suitable for use in the manufacture of hygienic products. These products include shoes, garment or textile materials and other similar products which imitate the look of natural leather.

Coating compositions and processes for their use are also known in which mixtures are formed of the coating compositions and water based systems of elastomers such as, for instance, a mixture of carboxylated butadiene-acrylonitrile latex, caesin modified with ethylacrylate and a copolymer of maleic acid anhydride with styrene, reactive pre-condensate of urea-formaldehyde resin and polypropylene or polyisobutylene oil, and other mixtures, and after cross-linking and drying result in films suitable for the manufacture of hygienic goods.

The agreeable hand of these coating layers is influenced by the presence of polypropylene or polyisobutylene oils in the mixture of the elastomers. Although suitable products are obtained with the use of such oils, a still further improvement of this property, that is, the "hand" or feel as well as imparting pliability to the final products is obtained in accordance with the present invention.

It is, therefore, an object of this invention to obviate one or more drawbacks of the prior art and to provide coating compositions having microporous properties, a good hand and improved pliability. There is thus broadly disclosed an improved softening effect in mixtures of elastomeric substances for making coatings on surfaces of flexible sheet materials, such as for instance man-made leathers, by incorporating into the mixtures an oil-like homopolymer of a low-molecular hydrocarbon and optionally an oil-like copolymer produced substantially by copolymerization of propylene or isobutylene with any hydrocarbon as hereinafter defined or with alpha-methylstyrene.

Broadly, in accordance with the invention there is disclosed a coating composition comprising a mixture of 1) an elastomeric material, 2) a homopolymer formed from lower olefinic monomers containing about 2 to about 4 carbon atoms in their chains, and 3) optionally a copolymer material, the copolymeric material being formed from (a) olefinic monomers having about 2 to about 4 carbon atoms in the carbon chain, and (b) olefinic monomers having the general formula:

wherein R is a radical selected from the group consisting of straight or branched chain alkyl radicals containing about 4 to about 20 carbon atoms in the carbon chain and cyclic radicals having the ability to combine with an alkyl radical.

The linear or branched chain alkyl may be for instance, butyl-, hexyl-, decyl-, hexadecyl-, and the like, while as cyclic radical, cyclohexyl-, phenyl-, alkylphenyl- and the like are suitable and may be used.

As employed in this specification and in the appended claims, a cyclic radical having the ability to combine with an alkyl radical includes radicals derived from aromatic compounds with one or two benzene rings, such as styrene and vinylnaphthalene and radicals derived from cycloaliphatic compounds wherein the cyclic portion of the molecule contains 5 to 8 carbon atoms such as vinylcyclopentane, vinylcyclohexane, vinylcyclohexene and vinylcyclooctane, and the like. Also suitable for use as copolymers are the olefins of $C_2$ to $C_4$, where the olefinic comonomer is alpha-methylstyrene. The average molecular weight of the copolymers useful in the invention ranges from about 400 to about 3000, and the content of the olefinic comonomer of formula (I) in a copolymer is generally in the range of 1 to 20 molar percent.

The instant invention thus includes the provision of a coating composition comprising 0.2 to 15% of a homopolymer formed from a lower olefinic monomer containing 2 to 4 carbon atoms and a mixture of an elastomer and 0 to 15% of a copolymer selected from the group consisting of (1) copolymeric material formed from (a) olefinic monomers having 2 to 4 carbon atoms and (b) an olefinic monomer having the formula:

wherein R is selected from the group consisting of linear or branched chain alkyl radicals containing about 4 to about 20 carbon atoms in the carbon chain and carbo-cyclic radicals selected from the group consisting of aromatic radicals containing one to two benzene rings, and cycloaliphatic radicals containing from about 2 to about 12 carbon atoms in their chain, and (2) mixtures of (1).

Thus, the softening ingredient of the elastomeric mixtures is to be regarded as either a homopolymer formed from monomers of low-molecular weight aliphatic hydrocarbons with about 2 to about 4 carbon atoms in their chain, a copolymer formed from olefinic monomers with about 2 to about 4 carbon atoms in their chains and from olefinic monomers of the general formula:

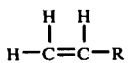

wherein R is a linear or branched-chain alkyl radical containing about 4 to about 20 carbon atoms in its chain or a cyclic radical capable of combining with an alkyl radical. The radical R for the cyclic radical are five or six member containing cyclic systems, formed from carbon atoms in the chain, such as for instance:
 a. aromatic radicals containing from one to two benzene rings, i.e., phenyl-, benzyl-, naphthyl-,
 b. cycloaliphatic radicals containing about 4 to about 12 carbon atoms, i.e., cyclooctyl-, cyclopentyl-, cyclohexyl-, or cyclohexenyl.

Consequently, heteroatomic cyclic systems may not be selected for the radical R. Moreover, instead of the hydrocarbon radical designated R, alpha-methyl-styrene may be used of the formula:

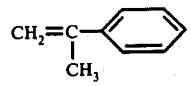

which is incorporated into the structure according to the general formula after disrupting the double bond, as follows:

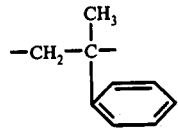

Generally speaking, the ratio of monomer (a) to comonomer (b) in the copolymer, where employed will be about 95:5 to 20:80, preferably about 80 molar % to 20 molar %, although the ratios are substantially non-critical.

The ratio of homopolymer to copolymer where employed, will generally be about 10:1 to 1:10 by weight, preferably about 1:2 by weight.

It is, of course, to be understood that the preparation of the elastomeric substances or of the homopolymers or copolymers per se, represent a non-essential part of the instant invention and are produced in accordance with procedures known in the art.

THe copolymers of the oil-like softening agents may be formed from a) propylene or isobutylene with b-1) a hydrocarbon according to the above-mentioned general formula, or b-2) alpha-methylstyrene.

The overall quantity of the oil-like softening mixture represents about 1 to 25 parts, preferably from about 5 to about 10 parts by weight, based on 100 parts by weight of the elastomer dry matter, while the quantity of the copolymeric oil-like ingredient of the softening mixture ranges from about 1 to about 7 parts by weight. The amount of the copolymer where employed as the softening ingredient alone will generally be about 0,2 to 20 parts by weight, preferably from about 1 to 7 parts by weight based on 100 parts by weight of the elastomeric mixture dry matter.

In a non-aqueous medium, the oil-like agent, that is the mixture of both where employed, or only the homopolymer of the oil-like substances according to the present invention acts like a protective colloid.

The softening effect of the present invention cannot be achieved, when pastes of polyvinyl chloride are used, as the softening effect of homopolymeric polypropylene or polyisobutelene oil alone, or of the oil-like copolymers of propylene and isobutylene with olefinic or cyclic hydrocarbons and alpha-methylstyrene according to the above mentioned general formula, and especially of the mixture of homopolymers with the copolymers according to the present invention is specific for elastomers exhibiting a not too pronounced polarity, such as for instance for copolymers of butadiene-acrylonitrile, butadiene-styrene, and butadiene-acrylate elastomers, as well as for elastomers based on polyurethanes.

As the elastomeric components for the surface coatings, two possibilities are substantially involved:
 a. a mixture of polyurethane dissolved in dimethylformamide with a copolymer of ethylene-maleic-anhydride, or
 b. a mixture of an aqueous dispersion of butadiene-acrylonitrile copolymer with a copolymer of styrene-maleic-anhydride.

The combination of elastomeric substances according to a) corresponds in the instant specification to Examples 1, 2, 4 and 5, while Example 3 corresponds to the possibility given under b).

The effect of the mixture of elastomeric substances in combination with oil-like olefinic softening agents according to the present invention for the manufacture of coatings on flexible sheet materials may be derived from the ability of polyurethane elastomers, which are characterized by strongly polar groups — CO — NH —, and acidic carboxylic groups — COO— (derived from maleic anhydride copolymers) to form di-polar, ionic, or chemical bonds, very similar to, or resembling the proteinaceous bonds in natural leathers. During the process of drying, owing to the admixture of oil-like softening agents, a gel-like structure is formed, which upon evaporation of the organic solvent disrupts thereby forming microporous sheets and materials, enabling water vapors and air to permeate therethrough. The oil-like softening agents regulate the velocity of micro-crack formation and thus also the size and distribution of the final pores. Moreover, when a suitable mixture of oil-like homopolymer and oil-like copolymer according to the present invention is selected, effects are achieved similar to effects of a secondary softening agent, that is, a part or a portion of the oil-like agent remains adsorbed inside the elastomeric phase, while another portion separates from the phase, and during the flexing steps echibits a lubricating effect, thereby imparting an agreeable "hand" or "touch" to the coating.

The copolymers for the oil-like softening ingredient, are as a rule prepared by the ion-process of copolymerization, and exhibit a wide distribution of copolymer compositions.

For the formation of microporous structure in the coatings, the admixture of the oil-like copolymer with the oil-like homopolymer according to the invention plays the important role. Thus, the formation of the microporous structure may be influenced in the desired direction with a sufficiently regulated velocity with the final effect of achieving its homogeneity or uniformity.

The term "elastomeric material" as used hereinafter and in the appended claims is to be understood to mean those elastomers mentioned hereinabove and similar materials known in the art by that term, with or without the addition of oils. Elastomer or elastomeric material therefore may mean but not be limited to the polyurethanes, copolymers of ethylene-maleic-anhydride, and urea-formaldehyde resins.

The elastomeric material and the copolymeric material can be employed in a range of from about 100 parts by weight of elastomer to about 5 to 50 parts by weight copolymer and preferably about 15 to 25 parts by weight of copolymer, the homopolymeric oil is employed in a range of from about 5 to 10 parts by weight.

A great advantage, however, is obtained by using the copolymers in the form of their water dispersions in organic solvent systems of the elastomers, inasmuch as water contained in the dispersions brings about gelling of the elastomers in the system. The copolymers present in the mixture are believed to act as a protective colloid so that a stable micro-gel is formed. The films made of this micro-gel have an excellent microcapillary structure, which results in high sorption values and desorption properties of the flexible sheet materials coated with these mixtures.

In the copending application, Ser. No. 177,493, now U.S. Pat. No. 3,852,230 of the same inventors filed even date with the parent application herein and which is based on Czech application No. PV 6906-70 of Oct. 14, 1970, impregnating compositions are disclosed. The disclosure of the aforementioned application is incorporated herein by reference.

Useful organic solutions of the elastomeric material include dimethylformamide and dimethylsulfoxide, tetrahydrofurone and mixtures of these with acetone and benzene and the like. Generally, enough solvent is employed to at least dissolve the elastomeric material. However, as a pratical matter, in solutions of elastomeric material in such solvents, the solutions may contain about 5 to about 20 percent by weight of elastomeric material based on the total weight of the elastomeric material and solvent.

Generally, the coating compositions of this invention are produced simply by mixing the constituents in the desired amounts at room temperature (about 20° C.). However, where necessary, heat can be employed to bring about proper mixing. In this regard, the mixture may be heated to just below its decomposition temperature, if necessary. Usually, temperatures in a range of about 10° to about 35° C. are sufficient to provide a homogeneous mixture.

On the other hand, it has been found suitable to use 70% aqueous dispersions of polymeric material. These dispersions are added into the organic solvent mixtures of elastomeric material in an amount as high as 12 percent by weight, based on the amount of elastomer present. Moreover, it is to be understood that mixtures of one or more copolymers or elastomers can be employed in practicing the invention.

As has been previously stated, by introducing suitably chosen amounts of admixture of the above-mentioned copolymers into the mixtures for the formation of coating layers, films are formed having a very agreeable hand, especially when compared with the coating layers lacking these ingredients. It is to be noted, that pliability of the final products is increased, too.

In order to illustrate the present invention, the following nonlimiting examples are set forth. In the examples and the appended claims all parts, proportions and percents are be weight unless otherwise stated.

EXAMPLE 1

450 parts by weight of a 20 percent solution of polyurethane elastomer and 50 parts by weight of a 20 percent solution of a copolymer of ethylene and maleic acid anhydride, the molar ratio in the copolymer being, respectively, 60 of the former and 30 of the latter and having a molecular weight about 10,000, and 5 parts by weight of a copolymer of isobutylene with n-octene of average molecular weight of 1,500 and 2 parts by weight of polypropylene homopolymeric oil having an intrinsic viscosity of about 300 cP, are dissolved in 420 parts by weight of dimethylformamide at about 22° C. and stirred until a homogeneous solution is obtained. The prepared solution contains approximately 20 percent by weight of dissolved materials.

From this solution a film is formed by pouring it onto an endless support sheet, one side of which is lined with a thin layer of silicone rubber. The thickness of the coating layer is about 0.4 millimeters. The polyurethane is then coagulated by water washing and the organic solvent is washed using further portions of water.

Films, prepared in this way, exhibit advantageous physical and mechanical, as well as hygienic properties, very good pliability and agreeable "hand" as compared to films coated with an elastomer not containing the mixture of solftening copolymer and homopolymer.

EXAMPLE 2

Preparation of a polyurethane film according to Example 1 was carried out with the exception that instead of the mixture of softening oils used in Example 1, 5 parts by weight of a copolymer of isobutylene and alpha-methylstyrene having an average molecular weight of 900, and 5 parts by weight of polypropylene homopolymeric oil, the former and the latter being in the form of a 70 percent aqueous dispersion, are employed.

Again the final product exhibits greatly improved physical, mechanical and hygienical properties, as well as good pliability and "hand" in comparison to a control film not containing the mixture of the oil-like copolymer with homopolymer.

EXAMPLE 3

110 parts by weight of a 50 percent aqueous dispersion of 50% carboxylated butadiene-acrylonitrile elastomer which is a reaction product prepared by copolymerization of 28 parts by butadiene with 10 parts of acrylonitrile and 2 parts of methacrylic acid in 40 parts of water, 15 parts by weight of a 65 percent of an aequeous dispersion of a precondensate of urea with formaldehyde having a molar ratio of the monomethylol derivative and dimethylol derivative of about 1 to 0.5, respectively, 60 parts by weight of a 20 percent aqueous dispersion of a copolymer of styrene with maleic acid anhydride, the product containing both monomers in a molar ratio of about 1 to 1 and having a molecular weight of 22,000 and adjusted by means of ammonia to basic pH 9,9, 10 parts by weight of chrome-tanned leather powder, 10 parts by weight of finely ground casein pigment dispersion containing 20 percent of the pigment and 80 percent of casein, and 7 parts by weight of a copolymer of isobutylene with n-dodecene having a molecular weight of 1,500 and 3 parts by weight of polyisobutylene homopolymeric oil are homogenized at about 25° C. and then cast into a sheet, which has been previously coated with a thin layer of a silicone rubber.

The coatings of the invention may be obtained by immersion, painting, spraying and other conventional means. The sheet with the coating layer of the aforementioned coating mixture is then passed through a vacuum dryer at a temperature of 110° C. The finished film has good pliability and an agreeable "hand".

EXAMPLE 4

The procedure of Example 1 is repeated except that 1 part by weight of an oil-like copolymer of isobutylene with vinylcyclohexane having an average molecular weight of 1,200 and 4 parts by weight of an isobutylene homopolymeric oil of intrinsic viscosity of about 1,000 cP are added into the mixture of elastomeric coating substances. The percentage of solids in dimethylformamide is roughly the same. Like results are obtained.

EXAMPLE 5

The procedure according to Example 1 is followed; however, 6 parts by weight of a copolymer of isobutylene with 5-ethylhexene (the weight ratio of the monomers being 85 : 15, respectively) and 4 parts by weight of a polypropylene homopolymeric oil are used as the softening agent for the mixture of elastomeric coating substances. The intrinsic viscosity of both of the softening agents in the mixtures of elastomeric materials is 500 cP. The percentage of solids in dimethylformamide differs slightly from that of Example 1. Like results are obtained.

Typical properties of the polyurethane materials to which the instant invention is directed include, but are not limited to, the following summary.

Top coated fabric products prepared from thermoplastic polyurethane resin solutions exhibit excellent:
1. Toughness and abrasion resistance
2. Hand and drape characteristics
3. Plasticizer barrier properties
4. Low temperature flexibility
5. Adhesion to many substrates These properties can be obtained by either direct or transfer coating. Textiles coated with PVC or urethane foam and finished with polyurethanes are being used as high quality substitutes for leather in upholstery, handbags, luggage, accessories, rain coats, simulated leather skirts and dresses, coats, and fashion boots.

Thermoplastic polyurethanes, in granule form, differ significantly from the reactive, two component polyurethane systems. As they are free of reactive isocyanate, the resins do not require a cure to develop ultimate physical properties. This advantage makes them particularly suitable for use in solution applications, since all that is required is solvent removal. Other advantages of the one-component solution systems are:
1. The solutions exhibit an indefinite shelf life in properly selected solvents.
2. The solutions are unreactive in the presence of atmospheric moisture, i.e, moisture content of solvents is not a major factor.
3. In solution they are compatible with any other resins, such as PVC, epoxy, phenoxy, and nitrocellulose.
4. These solutions are readily pigmented by dispersion of common pigments or pigment master batches.

Because of their thermoplastic nature, solution-cast films can be heat sealed by the conventional methods, thus eliminating stitching or the need for special bonding cements. The resulting topcoat can be embossed any time after deposition.

These films have relatively high moisture vapor transmission (MVT) rates and are water-repellent. Hydrophobic agents such as silicones can be easily added to the solution prior to processing. Cast films also have excellent properties.

Polyurethane solution resins as above described are especially preferred and can be divided into three groups:

| Group No. 1 | Hardness Shore A | Tack at Elevated Temps. | Brookfield Viscosity, cps[*] |
|---|---|---|---|
| 1 | 95 | Low | 670 – 1290 |
| 2 | 88 | Medium | 400 – 800 |
| 3 | 76 | Medium | 400 – 800 |

Note[*]:
With two exceptions, solution viscosities are based on a 15% total solids solutions in THF. Measurements are by Brookfield viscometer, Model RVF, No. 2 spindle, 20 rpm, at 23° C.

These materials are polyester-urethane resins. They are soluble in high hydrogen bonding solvents such as THF or DMF and in blends of these solvents with ketones such as MEK or acetone and other diluents.

| Group No. 2 | Hardness Shore A | Tack at Elevated Temps. | Brookfield Viscosity, cps[*] |
|---|---|---|---|
| 1 | 97 | Medium | 100 – 200 |
| 2 | 70 | High | 300 – 499 |
| 3 ** | 70 | High | 500 – 799 |
| 4 | 70 | High | 800 – 1200 |

Note[*]:
With two exceptions, solution viscosities are based on a 15% total solids solutions in THF. Measurements are by Brookfield viscometer, Model RVF, No. 2 spindle, 20 rpm, at 23° C.
** Estane 5707 F-1 is a 15% solution in DMF and No. 1 of Group 2 is a 20% solution in MEK.

These resins, too, are polyester-urethanes. They exhibit the same solubility characteristics as Group No. 1, but are also soluble in ketones alone. These solutions may also be modified with diluents.

No. 1 of Group 2 comprises an exceptionally low solution viscosity resin designed specifically for coating applications. Because of its low viscosity, it is widely used in leather finishing lacquers and other applications involving spray coating. Relatively high total solids levels of this resin solution spray well.

| Group No. 3 | Hardness Shore A | Tack at Elevated Temps. | Brookfield Viscosity, cps* |
|---|---|---|---|
| 1 | 80 | Low | 600 – 1200 |

Note*:
With two exceptions, solution viscosities are based on a 15% total solids solutions in THF. Measurements are by Brookfield viscometer, Model RVF, No. 2 spindle, 20 rpm, at 23° C.

No. 1 of Group 3 is a polyether urethane. This resin is inherently stable to hydrolysis and fungus attack. It has excellent low temperature flexibility and high MVT. The resistance thereof to organic chemicals is somewhat lower than those of Group No. 1.

COMPOUNDING OF SOLUTION RESINS

Because of the exceptional compatibility of these resins with a wide variety of other polymers, they may be readily compounded to obtain special properties.

The present invention presents many advantages. For example, the coating compositions of this invention can be made with relatively inexpensive and readily available materials by simple procedures which do not require elaborate equipment and results in greatly improved products. Numerous other advantages will be apparent to those skilled in the art.

Estane 5707 F1 is one of a class of polyester urethanes and polyether urethanes of the type sold by B. F. Goodrich Chemical Company as described in U.S. Pat. Nos. 2,899,411 and 2,871,218. As such, it comprises the reactive product of hydroxyl poly (tetramethylene oxide), butanediol-1,4, and diphenyl methane-p,p' - diisocyanate.

We claim:

1. A coating composition consisting essentially of 0.2 to 20 parts by weight of an oil-like homopolymer formed from a lower olefinic monomer containing 2 to 4 carbon atoms and a mixture of 100 parts by weight, on a dry basis of a thermoplastic polyester-urethane or polyether urethane elastomer produced from the reactive product of hydroxyl poly(tetramethylene oxide), butane diol-1,4, and diphenyl methane p,p'-diisocyanate and 0 to 20 parts by weight of a oil-like copolymer selected from the group consisting of (1) copolymeric material formed from (a) an olefin having 2 to 4 carbon atoms and (b) an olefin having the formula:

wherein R is selected from the group consisting of linear or branched chain alkyl radicals containing about 4 to about 20 carbon atoms in the carbon chain and carbo-cyclic radicals selected from the group consisting of aromatic-cyclic radicals containing one to two benzene rings, and cycloaliphatic carbo-cyclic radicals containing from about 2 to about 12 carbon atoms in their chain, and (2) mixtures of (1).

2. A composition as defined in claim 1 wherein said aromatic radical is selected from the group consisting of phenyl, benzyl and naphthyl.

3. A composition as defined in claim 1 wherein said cycloaliphatic radical is selected from the group consisting of cyclohexyl-, cyclohexenyl-, cyclopentyl-, cyclooctyl-, and alpha-methylstyrene.

4. A composition as defined in claim 1 wherein said copolymer is employed in amounts of 0.2 to 20 parts by weight.

5. A composition as defined in claim 1 wherein the relative ratio of homopolymer to copolymer is about 10:1 to 1:10.

6. A composition as defined in claim 1 wherein said homopolymer is polypropylene.

7. A composition as defined in claim 1 wherein said homopolymer is polyisobutylene.

8. A composition as defined in claim 1 wherein said copolymer is from isobutylene and n-octene.

9. A composition as defined in claim 1 wherein said copolymer is from isobutylene and alpha-methylstyrene.

10. A composition as defined in claim 1 wherein said copolymer is from isobutylene and n-dodecene.

11. A composition as defined in claim 1 wherein said copolymer is from isobutylene and vinylcyclohexane.

12. A composition as defined in claim 1 wherein said copolymer is from isobutylene and 5-ethylhexane.

13. A composition as defined in claim 1 wherein the elastomer and the copolymer are employed in a range of about 100 parts of elastomer to about 5 to 50 parts copolymer.

14. A composition as defined in claim 1 wherein the molecular weight of the copolymer is about 400 to about 3000 and the content of the monomer of formula (I) in the copolymer is about 1 to about 20 molar percent.

15. A composition as defined in claim 1 including an organic solvent.

16. The coating composition as defined in claim 1, wherein the molar ratio of olefin (a) to olefin (b) as in the range from about 95:5 to 20:80.

17. The coating composition of claim 1, wherein the combined amount of said homopolymer and said copolymer are in the range from 1 to 25 parts by weight.

18. The coating composition of claim 17 wherein the amount of the copolymer is in the range from about 1 to 7 parts by weight.

19. The coating composition of claim 18, wherein the molar ratio of olefin (a) to olefin (b) is in the range from about 95:5 to 20:80.

20. A coating composition consisting essentially of an organic system of 0 to 20 parts by weight of a oil-like homopolymer formed from a lower olefinic monomer containing 2 to 4 carbon atoms and a mixture of 100 parts, on a dry basis, of a thermoplastic polyesterurethane or polyether urethane elastomer produced from the reactive product of hydroxyl poly)tetramethylene oxide), butane diol-1,4, and diphenyl methane p,p'-diisocyanate and 0.2 to 20 parts by weight mixture dry matter of a oil-like copolymer selected from the group consisting of (1) copolymeric material fromed from (a) an olefin having 2 to 4 carbon atoms and (b) an olefin having the formula:

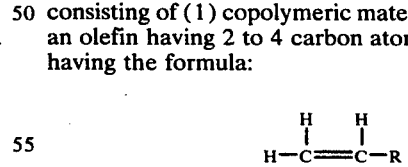

wherein R is selected from the group consisting of linear or branched chain alkyl radicals containing about 4 to about 20 carbon atoms in the carbon chain and carbo-cyclic radicals selected from the group consisting of aromatic carbo-cyclic radicals containing one to two benzene rings, and cycloaliphatic carbo-cyclic radicals containing from about 2 to about 12 carbon atoms in their chain, and (2) mixture of (1).

21. The coating composition of claim 20, wherein the amount of the copolymer is in the range from about 1 to 7 parts by weight.

* * * * *